United States Patent [19]
Duditza

[11] Patent Number: 5,820,468
[45] Date of Patent: Oct. 13, 1998

[54] BIPODE JOINT

[75] Inventor: Florea Duditza, Brasov, Romania

[73] Assignee: GKN Gelenkwellenbau GmbH, Essen, Germany

[21] Appl. No.: 819,241

[22] Filed: Mar. 17, 1997

[30] Foreign Application Priority Data

Mar. 21, 1996 [DE] Germany .................. 196 11 175.7

[51] Int. Cl.⁶ .................................................. F16D 3/202
[52] U.S. Cl. ........................... 464/123; 464/132; 464/905
[58] Field of Search .................................. 464/111, 120, 464/122, 123, 132, 905, 162

[56] References Cited

U.S. PATENT DOCUMENTS

| | | | |
|---|---|---|---|
| 1,072,612 | 9/1913 | Hermann | 464/132 |
| 1,543,575 | 6/1925 | Kishline . | |
| 1,553,312 | 9/1925 | Garrecht | 464/122 |
| 1,940,779 | 12/1933 | Williams | 464/123 |
| 2,284,198 | 5/1942 | Greiner | 464/123 |
| 2,752,765 | 7/1956 | Wildhaber | 464/123 |
| 2,874,556 | 2/1959 | Kraus . | |
| 2,891,392 | 6/1959 | Wildhaber | 464/123 |
| 2,906,105 | 9/1959 | De Lorean | 464/123 |
| 2,914,930 | 12/1959 | Wildhaber | 464/123 |
| 2,984,997 | 5/1961 | Wight | 464/905 |
| 3,008,311 | 11/1961 | Mazziotti | 464/123 |
| 3,204,427 | 9/1965 | Dunn . | |
| 3,748,869 | 7/1973 | Orain | 464/132 |

FOREIGN PATENT DOCUMENTS

| | | | |
|---|---|---|---|
| 1830662 | 1/1959 | Germany . | |
| 1838914 | 12/1960 | Germany . | |
| 25 30 670 A1 | 1/1976 | Germany . | |
| 188382 | 3/1937 | Sweden | 464/123 |
| 1003513 | 9/1965 | United Kingdom . | |
| WO 95/11390 | 4/1995 | WIPO . | |

Primary Examiner—Eileen A. Dunn
Attorney, Agent, or Firm—Harness, Dickey & Pierce, P.L.C.

[57] ABSTRACT

A bipode joint has a first joint part (1) with a first longitudinal axis (2) and a second joint part (23) with a second longitudinal axis (27). The first joint part (1) has an arm (3) whose diameter is stepped and includes a roller (7') whose face also includes a stepped diameter. The faces are an outer face (9) with a smaller diameter and, on the radial inside, a transmitting face (11) with a larger diameter. A spherical zone is arranged between the two faces. Two running faces (30) are on the second joint part (23) to guide the outer face (9). In the radially inward direction, the running face (30) is followed by a supporting face (32). The supporting face (32) is a partial cylindrical face to support the roller (7') with its spherical zone (10). Further inwardly, towards the second longitudinal axis (27), a supplementary running face (34) follows the support face (32). The supplementary running face serves as a supporting face for the transmitting face (11) of the roller (7'). Rings (35, 36) with hollow spherical zones (39, 40) are provided to limit the plunging distance (54). The rings contact the roller (7') with its spherical zone (10) when adjusted accordingly. It has been possible to achieve a joint with a high torque transmitting capacity and advantageous centering conditions due to the support provided by the spherical zone (10).

15 Claims, 4 Drawing Sheets

BIPODE JOINT

BACKGROUND OF THE INVENTION

The invention relates to a bipode joint. A first joint part includes a first longitudinal axis and two arms which extend at a right angle relative to the first longitudinal axis. The arm axes are positioned in a plane containing the first longitudinal axis. Rollers are supported on the arms. A second joint part includes a second longitudinal axis and a central cavity to accommodate the first joint part. Two opposed running faces on the second joint part are open towards the cavity. The running faces extend parallel to the second longitudinal axis and support the rollers with their outer faces. The first joint part also includes a first connecting means and the second joint part a second connecting means.

A bipode joint is illustrated, for example, in the book by F. Schmelz, H.-Ch. Graf von Seherr-Thoss and E. Aucktor "Gelenke und Gelenkwellen" (Joints and jointed shafts"), Konstruktionsbücher, Volume 36, published by Professor Dr.-lng. G. Pahl, Springer-Verlag 1988, page 152, Figure 4.35. In this embodiment, the rollers have a spherical surface with its diameter centered on the arm axis. The tracks are cylindrical. The arms are associated with sliding blocks to provide support in the direction of the arm axis on the second joint part. The outer face of the blocks is spherical. The blocks, together with one arm, are inserted into bores in the end faces of the arms. The second joint part is open at its end face. This enables the first joint part, together with the arms, rollers and sliding blocks, to be slid into the second joint part from the end face. Such a design leads to a relatively large diameter with respect to the transmitting torque.

Bipode joints are preferably used for small articulation angles. However, to provide support via spherical faces associated with the rollers on the outside in the track of the second joint part, means that the second joint part has to be closed to be able to accommodate the forces required for radial guiding purposes. In consequence, it is necessary to make available a correspondingly larger radial space.

DE-GM 1 830 662 describes a bipode joint with two arms associated with the first joint part. Each arm carries two rollers arranged at different distances from the rotational axis. The two radially outer rollers serve to transmit torque in the one direction of rotation. The outer rollers rest against the first faces which extend parallel to the axis of rotation of the other joint part. Thus, the outer rollers are not supported with respect to the opposed direction of rotation. The radially inner rollers serve to transmit torque in a direction of rotation opposite to the first direction of rotation. The inner rollers rest against the respective further faces of the other joint part and are not supported in the first direction of rotation. To radially center the first joint part relative to the second joint part, external spherical inserts engage the end faces of the arms. The inserts are radially supported against a cylindrical face of a tube surrounding the second joint part. Because of the division and effect, the carrying length of the two rollers for torque transmitting purposes, in each case, is short for one direction of rotation only, so that the torque transmitting capacity is correspondingly low.

GB 1 003 513 describes a bipode joint where the first joint part has two arms on which rollers are rotatably arranged. Bearings are between the rollers and arms. At their radially inner ends, the rollers each include a collar. The collar faces point away from the longitudinal axis and are in the form of spherical annular faces. The spherical annular faces guide the first joint part relative to the second joint part in the radial direction by resting against a cylindrical bore wall on both sides of the axis-parallel faces of an aperture in which the cylindrical outer faces of the rollers are guided.

SUMMARY OF THE INVENTION

It is an object of the invention to improve centering of the two joint parts relative to one another and to increase torque transmitting capacity.

In accordance with the invention, the running faces of the second joint part are planar faces which extend parallel relative to the second longitudinal axis and relative to one another. In the radial direction towards the second longitudinal axis, the planar faces are followed by supporting faces. The supporting faces are in the form of cylindrical partial faces of a hollow cylinder whose cylinder axis is formed by a second longitudinal axis. Along the second longitudinal axis, the supporting faces are followed by supplementary running faces. The supplementary running faces extend parallel relative to the running faces. The supplementary running faces are positioned at a greater distance from one another than the running faces. The rollers, supported on the running faces, include cylindrical outer faces. Spherical zones radially support the first joint part on the supporting faces of the second joint part. The spherical zones have a spherical radius which is centered on the first longitudinal axis. The spherical radius corresponds to the radius of the supporting faces. The spherical zones form part of the rollers or of separate supplementary rollers supported on the arms. The rollers or the supplementary rollers, at each of the spherical zones, are followed in the radial direction towards the first longitudinal axis, by a cylindrical transmitting face. The cylindrical transmitting face is centered on the arm axis, and is guided between the supplementary faces of the second joint part and is intended to be supported on the supplementary faces.

An advantage of this embodiment is that additional transmitting faces are provided for the transmission of torque. An additional advantage is that the spherical zones of the rollers and supplementary rollers respectively achieve advantageous centering conditions. As a result of the spherical zones, it is possible to accommodate relatively high forces in the radial direction. Another advantage when providing a supplementary roller is a reduction of the percentage of friction during articulation. The reduction is due to the fact that the roller and supplementary rollers are able to rotate independently of one another. Furthermore, the torque transmitting capacity is increased. This is accomplished by using the entire wall thickness of the second joint part between the cavity and the outer face as a supporting length for the roller and roller with supplementary roller, respectively. In addition, the transmitting face whose diameter is increased relative to the outer face of the roller increases the torque transmitting capacity.

In a further embodiment of the invention, an increase in the torque transmitting capacity is achieved by a supplementary roller with a bearing bore greater than the bearing bore of the roller. If only one roller per arm is present, one roller includes a bearing bore with two bore portions, each portion with different diameters. The bore portion with the greater diameter is arranged in the region of the supplementary faces. In this connection, each arm has two cylindrical bearing faces with different diameters. The bearing face with the greater diameter is associated with the bore portion with the greater diameter. It is possible to reinforce the arm by providing additional support for the rollers and in cases of a divided embodiment, with supplementary rollers. Thus, on the radial inside, a relatively large arm portion is available which can also be used for torque transmitting purposes. As far as strength is concerned, the design is similar to that including a carrier with the same strength. Furthermore, the surface pressure along the length of the bearing means at the arm becomes more uniform.

In a preferred embodiment, the rollers and/or supplementary rollers are supported by rolling contact members on the bearing faces of the arms. The rolling contact members are in the form of roller members.

According to a further embodiment of the invention, axial movement of the two joint parts relative to one another is limited by hollow spherical zones. The hollow spherical zones are provided at the second joint part and are offset relative to one another along the second longitudinal axis. The hollow spherical radii correspond to the supporting faces, and the hollow spherical zones adjoin the spherical zones of the rollers or supplementary rollers. This means that advantageous contact conditions are achieved both in the direction of extraction and in the direction of insertion. The advantageous contact conditions can be used to design the bipode joint either as a fixed joint or as a plunging joint. In the case of fixed joints, the two joint parts can only carry out an angular movement relative to one another. With plunging joints, the parts are additionally able to compensate for changes in length by being adjustable relative to one another in the axial direction.

To achieve a plunging joint embodiment, the centers of the hollow spherical zones are offset relative to one another on the second longitudinal axis. The amount of offset is such that an imaginary distance between the two points of intersection of the spherical radii of the spherical zones with the second longitudinal axis is greater than the sum of the two spherical radii. The distance between the two centers of the hollow spherical zones permits the possible axial plunge between the two joint parts.

To achieve a fixed joint embodiment, the two hollow spherical zones include a common center on the second longitudinal axis. In this embodiment, the spherical zones of the rollers and supplementary rollers, respectively, are bordered in four places in the direction of the longitudinal axis by two hollow spherical zones and in the circumferential direction by the two supporting faces.

To simplify the assembly of the joint and to achieve a more compact design, the running faces form a part of slots which are open towards one end face of the second joint part. An annular locking element is removably connected to the webs of the second joint part. The webs are located between the slots. The locking element increases stability, with the bending moments which act on the webs being more easily accommodated.

To achieve a closed unit, the second joint unit is associated with a cover sleeve. The cover sleeve covers the region of the second joint part. The region includes the running faces. A particularly advantageous method of producing the centering hollow spherical zones is achieved if each hollow spherical zone forms part of a ring which is separate from the second joint part. The rings are secured to the second joint part and/or to the locking element.

From the following detailed description, taken in conjunction with the drawings and subjoined claims, other objects and advantages of the present invention will become apparent to those skilled in the art.

BRIEF DESCRIPTION OF THE DRAWINGS

Two preferred embodiments of the invention are diagrammatically illustrated in the drawing wherein.

DETAILED DESCRIPTION OF THE DRAWINGS

Figure 1:
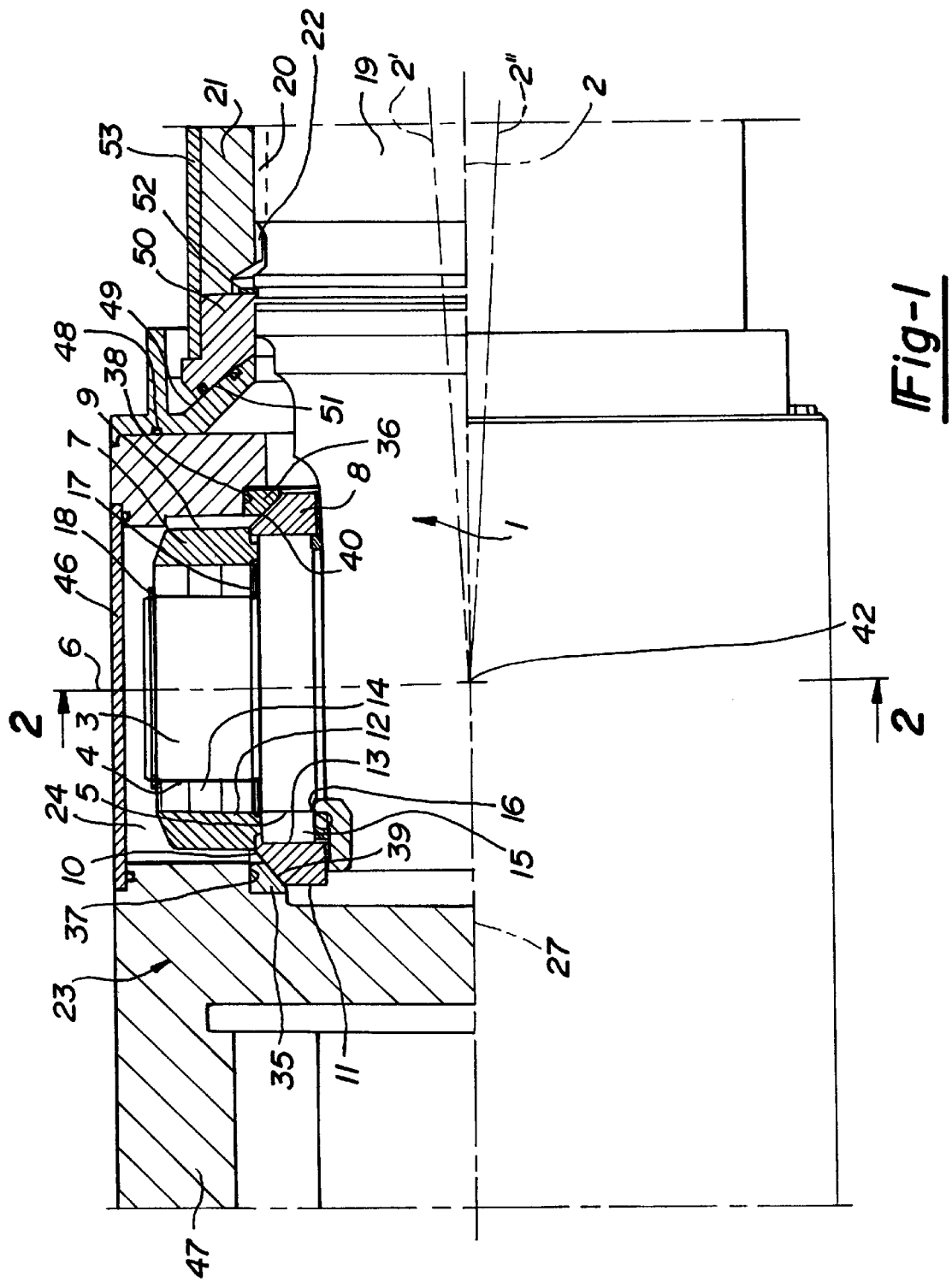
FIG. 1 is a cross sectional side view of a bipode joint provided in the form a fixed joint.
Figure 2:
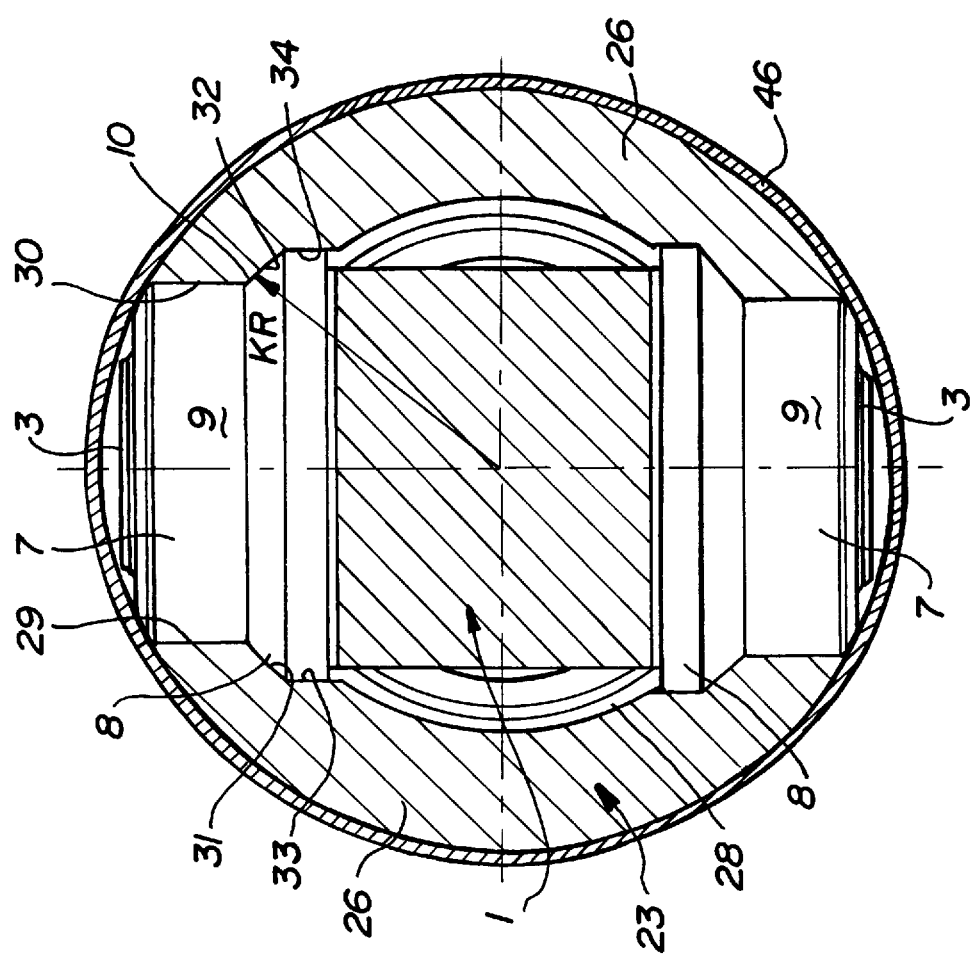
FIG. 2 is a section view of FIG. 1 along line II-II thereof.
Figure 3:
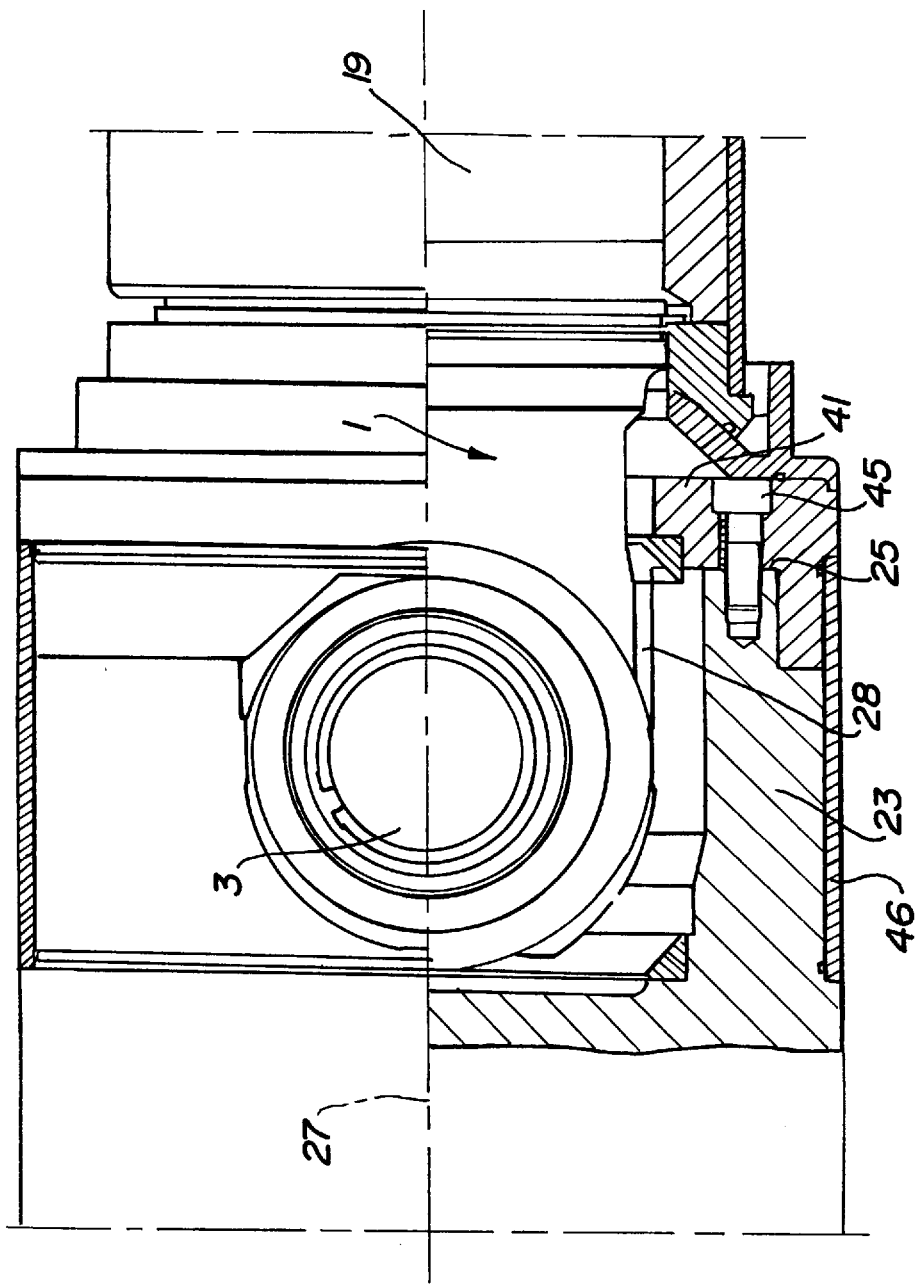
FIG. 3 is half a section along sectional line III-III to FIG. 2.

The bipode joint shown in FIGS. 1 to 3, in the form of a fixed joint, includes a first joint part 1 with a first longitudinal axis 2. The first joint part I has two arms 3 arranged at a right angle relative to the first longitudinal axis 2. The arm axis is designated with the reference number 6. The two arms 3 define a common arm axis 6. The two arms 3 have bearing faces 4, 5 with stepped diameters. The bearing face 5, which is close to the first longitudinal axis 2, has a greater diameter than the bearing face 4. The two bearing faces 4, 5 are cylindrical. The axis is centered on the arm axis 6.

A roller 7 is arranged on the bearing face 4 by means of a rolling contact member 14 and, thus, rotatable around the arm axis 6. For supporting purposes, the roller 7 includes a bore portion 12. The roller 7 has a cylindrical outer face 9. The rolling contact members 14 are held between the two bearing faces 4, 5 and a securing ring 18. A disc held by the securing ring 18 secures the roller 7 outwardly in the direction of the arm axis 6.

A supplementary roller 8, by its bore portion 13, is supported on the bearing face 5. A rolling contact member 15 is arranged between the roller 8 and bearing faces. The rolling contact member 15 supports the roller 7 inwardly towards the first longitudinal axis 2. In the axial direction, the supplementary roller 8 is supported against a supporting face 16 of the first joint part 1 towards the first longitudinal axis 2. Towards the first longitudinal axis 2, the supplementary roller 8 includes a cylindrical transmitting face 11. Towards the roller 7, the supplementary roller 8 has a spherical zone 10. The spherical zone 10 has a spherical radius (KR) centered on the longitudinal axis 2. The supplementary roller 8, by its end face positioned away from the spherical zone 10, is supported against the supporting face 16 of the first joint part 1.

The first joint part 1 includes a connecting journal 19. The connecting journal 19 is received in the teeth 22 of a sleeve 21. The teeth 20 associated with a driveshaft by means of teeth 20 are provided at the connecting journal 19 and extend parallel to the first longitudinal axis 2.

The sleeve 21 is connected to a joint (not illustrated) similar to the bipode joint shown in FIGS. 1 to 3. The first joint part 1 is accommodated in the second joint part 23 which defines a second longitudinal axis 27. Starting from the end face 25, the second joint part 23 includes two slots 24 which are offset relative to one another by 180°. Webs 26 are formed between the slots 24. The slots 24 extend from the cavity 28 to accommodate the first joint part 1 to the outer face of the second joint part 23.

The rollers 7 and supplementary rollers 8 are arranged on arms 3. The arms 3 of the first joint part 1 extend into the slots 24. Each slot includes two running faces 29, 30. The running faces 29, 30 are designed as planar faces and guide the rollers 7 via their cylindrical outer faces 9. Supporting faces 31, 32 follow the two running faces 29, 30 towards the inside, in the direction of the second longitudinal axis 27 of the second joint part 23. The supporting faces 31, 32 are in the form of cylindrical partial faces, with the axis of the cylinder centered on the second longitudinal axis 27. The radius of the cylinder corresponding to the spherical radius (KR) of the spherical zone 10.

The supplementary roller 8 and thus the first joint part 1 are radially guided by the spherical zones 10 relative to the second joint part 2. Supplementary running faces 33, 34 follow the supporting faces 31, 32 towards the inside in the direction of the second longitudinal axis 27. Supplementary running faces 33, 34 extend parallel to the running faces 29, 30. The two supplementary running faces 33, 34 guide the supplementary roller 8 with its cylindrical transmitting face 11. The webs 26 of the second joint part 23 are associated with an annular locking element 41. The locking element 41 is fixed to the two webs 26 by bolts 45. The locking element 41 is designed such that it also extends over the webs 26. Thus, the locking element holds the webs and prevents the webs from escaping radially outwardly under torque or from being displaced in the circumferential direction. The second joint part 23 is provided with a recess 37 centered on the second longitudinal axis 27. The recess 37 receives a ring 35 which includes a hollow spherical zone 39. The spherical radius corresponds to that of the spherical zone 10. The supplementary roller 8 is guided with its spherical zone 10.

The locking element 41 also includes a recess 38 which is centered on the second longitudinal axis 27. The recess 38 receives a further ring 36 which includes a hollow spherical zone 40. The spherical radius corresponds to that of the spherical zone 10.

The two hollow spherical zones 39, 40 include a common center 42 which is centered on the second longitudinal axis 27. The two hollow spherical zones 39, 40 are used to guide the supplementary rollers 8. Also, the zones 39, 40 guide the first joint part 1 in such a way, relative to one another, that the first joint part 1 only carries out angular movements relative to the second joint part 23 around the center 42. The maximum deflection of the first longitudinal axis 2 relative to the second longitudinal axis 27 is illustrated by the two articulated positions 2', 2" of the first longitudinal axis.

To seal the second joint part 23 to make it leakproof, a cover sleeve 46 is arranged on the portion containing the slots 24. The cover sleeve 46 also covers the webs 26. It is sealed by sealing rings relative to the second joint part 23 and relative to the locking element 41 associated with the second joint part 23. Furthermore, the second joint part 23 is associated with a connecting muff 47 which, for example, may be made to engage, and connected to, the journal of the roll of a rolling mill for the purpose of driving same. The two joint parts 1, 23 are sealed relative to one another by a seal. The seal has a sealing element 48 which is secured to the locking element 41. The sealing element 48 includes a spherical face 49 against which sealingly rests a cap 50 by means of its hollow spherical face 51. Both spherical faces additionally accommodate sealing rings. The cap 50, with its hollow spherical face 51, is held in contact with the spherical face 49 of the sealing element 48 by a securing element in the form of a securing ring 52. Furthermore, the cap 50 is provided with a protective tube 53 which covers the sleeve 21.

Figure 4:
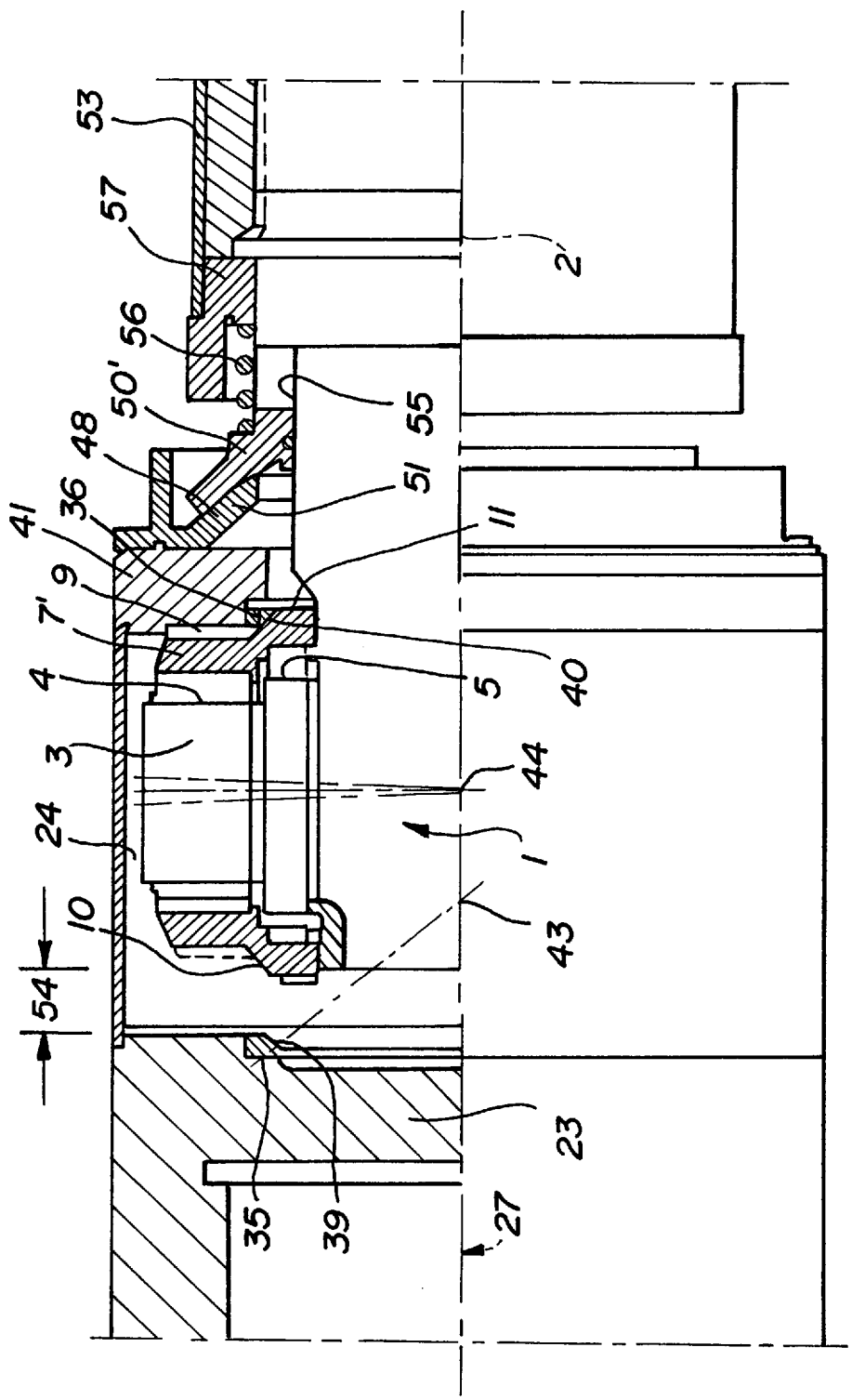
FIG. 4 shows a partial cross sectional side view of an embodiment of a bipode joint provided in the form of a plunging joint.

In the case of the embodiment according to FIG. 4 wherein the bipode joint is in the form of a plunging joint, the first joint part 1 is able to cover a plunging distance 54 relative to the second joint part 23. To achieve this objective, the rings 35, 36 include the two hollow spherical zones 39, 40 arranged at a distance from one another, so that the spherical zones 10 of the roller 7' are able to carry out an axial movement between the two running faces 29, 30 and supplementary running faces 33, 34 along the second longitudinal axis 27. The hollow spherical zones 39, 40 are arranged such that hollow sphere centers 43, 44 occur arranged at a distance from one another on the second longitudinal axis 27. The distance between the centers corresponding to the plunging distance.

Furthermore, the arrangement of rollers differs as compared to the embodiment according to FIGS. 1 to 3. In the embodiment according to FIG. 4, the roller and supplementary roller are combined to form one roller 7'. In addition to the outer face 9 with the smaller diameter, the roller 7' includes the transmitting face 11 with a larger diameter. Furthermore, the roller 7' has two bore portions which, via the intermediate rolling contact members, support the roller 7' on the bearing faces 4, 5 of the arm 3. The bearing faces have stepped diameters.

The axial displacement of the first joint part 1 relative to the second joint part 23 is limited by the roller 7', by its spherical zone 10 running against the hollow spherical zones 39, 40.

Providing the joint in the form of a plunging joint results in a further modification regarding the sealing conditions of the two joint parts 1, 23. The locking element 41 is also associated with a sealing element 48 with a spherical face 49 which again cooperates with a cap 50' with a hollow spherical face 51. However, in contrast to the embodiment according to FIGS. 1 to 3, the cap 50' is arranged on a cylindrical seat face 55 of the first joint part 1. Thus, the first joint part 1 is able to carry out a longitudinal movement relative to the cap, without the cap 50' changing its position in the axial direction. The cap 50', when contacting the sealing element 48, is loaded by a spring 56 which is supported on the cap 50' on one end and, at its other end, on a holding ring 57. The holding ring 57 in the axial direction, is secured to the first joint part 1 by a securing ring which, in turn, carries the protective tube 53.

While the above detailed description describes the preferred embodiment of the present invention, the invention is susceptible to modification, variation and alteration without deviating from the scope and fair meaning of the subjoined claims.

I claim:

1. A bipode joint comprising:

a first joint part with a first longitudinal axis and with two arms extending at a right angle relative to the first longitudinal axis, the arm axes of said arms being positioned in a plane containing the first longitudinal axis;

rollers supported on said arms;

a second joint part with a second longitudinal axis and a central cavity accommodating the first joint part, two opposed first running faces opening towards the cavity, said running faces extending parallel to the second longitudinal axis and supporting said rollers with outer faces, said running faces of said second joint part being planar faces extending parallel relative to the second longitudinal axis and relative to one another;

and said first joint part including first connecting means and said second joint part including second connecting means;

supporting faces following said first running faces in the radial direction towards the second longitudinal axis, said supporting faces being cylindrical partial faces of a hollow cylinder whose cylinder axis is formed by the second longitudinal axis;

supplementary running faces following said supporting faces towards the second longitudinal axis, said supplementary running faces extending parallel relative to the first running faces and positioned at a greater distance from one another than said running faces;

said rollers being supported on said running faces, said rollers including cylindrical outer faces;

spherical zones on said rollers for radially supporting the first joint part on the supporting faces of the second joint part, said spherical zones having a ball radius which is centered on the first longitudinal axis and which corresponds to a radius of the supporting faces;

a cylindrical transmitting face on said rollers following each of the spherical zones in the radial direction towards the first longitudinal axis, said cylindrical transmitting face centered on the arm axis and guided between the supplementary running faces of the second joint part and is supported on said supplementary running faces.

2. A bipode joint according to claim 1, wherein each said rollers include a supplementary roller which includes said spherical zone and a bearing bore whose diameter is greater than the bearing bore of the roller.

3. A bipode joint according to claim 2, wherein the rollers are supported by rolling contact members on the bearing faces of the arms.

4. A bipode joint according to claim 2, wherein axial movement of the two joint parts relative to one another is limited by hollow spherical zones provided at the second joint part and offset relative to one another along the second longitudinal axis, hollow spherical radii of said hollow spherical zones correspond to those of the supporting faces and said hollow spherical zones adjoin the spherical zones of the rollers.

5. A bipode joint according to claim 2, wherein the roller and supplementary roller are both supported by rolling contact members on the bearing faces of the arms.

6. A bipode joint according to claim 1, wherein said roller including a bearing bore with two bore portions with different diameters, and the bore portion with the greater diameter being adjacent the supplementary running faces.

7. A bipode joint according to claim 6, wherein the roller is supported by rolling contact members in both bearing bores on bearing faces of the arms.

8. A bipode joint according to claim 1, wherein each arm includes two cylindrical bearing faces with different diameters, with the bearing face with a greater diameter being associated with the bore portion with a greater diameter.

9. A bipode joint according to claim 1, wherein axial movement of the two joint parts relative to one another is limited by hollow spherical zones provided at the second joint part and offset relative to one another along the second longitudinal axis hollow spherical radii of hollow spherical zones correspond to those of the supporting faces and said hollow spherical zones adjoin the spherical zones of the rollers.

10. A bipode joint according to claim 9, wherein centers of the hollow spherical zones are offset relative to one another on the second longitudinal axis.

11. A bipode joint according to claim 9, wherein the two hollow spherical zones include a common center on the second longitudinal axis.

12. A bipode joint according to claim 9, wherein each hollow spherical zone forms part of a ring which is separate from the second joint part, said rings are fixed to the second joint part and to a locking element.

13. A bipode joint according to claim 9, wherein each hollow spherical zone forms part of a ring which is separate from the second joint part, said rings are fixed to the second joint part or to a locking element.

14. A bipode joint according to claim 1, wherein the first running faces form part of slots which are open towards one end face of the second joint part and an annular locking element is removably connected to webs of the second joint part, said webs located between the slots.

15. A bipode joint according to claim 1, wherein the second joint part is associated with a cover sleeve which covers the region of the second joint part, said region including the first running face.

* * * * *